Aug. 18, 1936.                J. W. D. COOK                 2,051,681
                              DISPLAY STAND
                            Filed Jan. 2, 1935            2 Sheets-Sheet 2
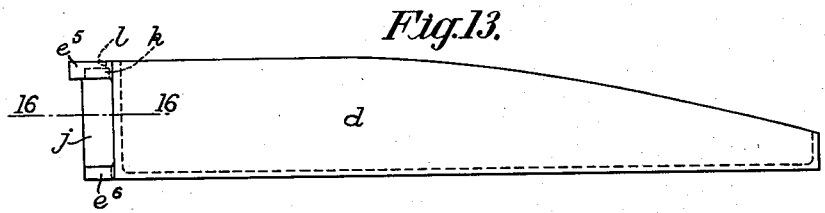
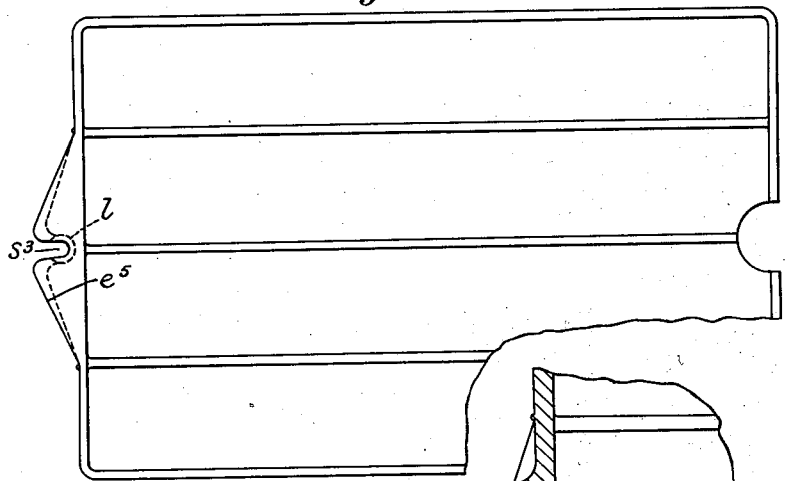
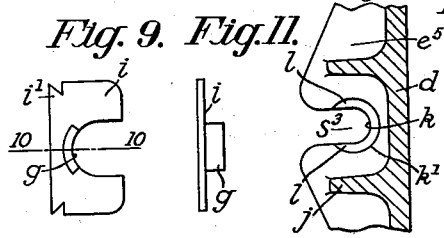
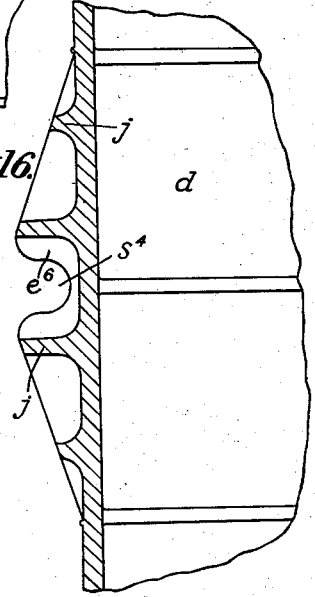
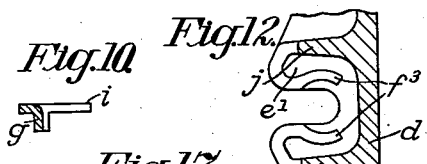
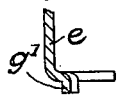
Inventor:- John W. D. Cook,
By:- Smith, Michael and Gardiner,
Attorneys.

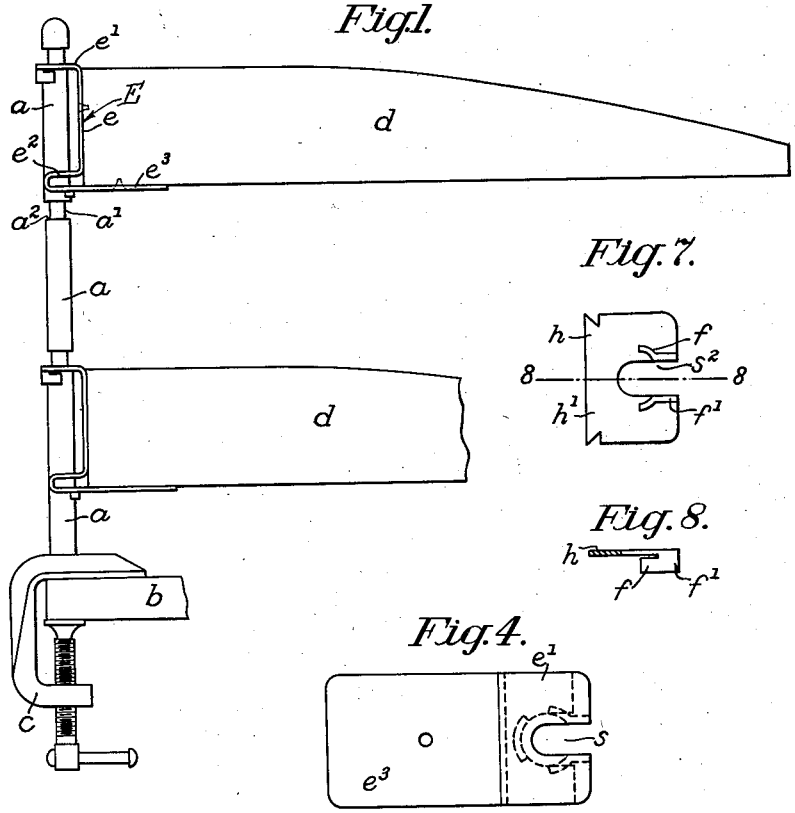

Patented Aug. 18, 1936

2,051,681

UNITED STATES PATENT OFFICE 2,051,681

DISPLAY STAND

John William Donald Cook, London, England

Application January 2, 1935, Serial No. 167
In Great Britain January 10, 1934

2 Claims. (Cl. 248—289)

This invention relates to display stands, correspondence trays or the like devices where it is desired that the carrier arm, receptacle or the like carrier member shall be displaceable around a pillar or upright.

The invention has reference more particularly to brackets for such carrier members used upon cylindrical or similar pillars to display goods in store windows or to support correspondence trays for office use.

The objects of the present invention are to provide an improved and inexpensive construction of bracket having upper and lower members or arms slotted to embrace the pillar; to provide a bracket which can in some cases be made entirely from pressings, stampings or mouldings and either in a single piece or in component parts; to construct a bracket which will be better able to be fitted to trays or stands to be supported; and further, to construct a bracket which will incorporate curved bearing surfaces which are wholly within the length of the slots in the upper and lower members and so protected and inconspicuous. In some cases, the bracket may be moulded integral with the tray, stand or other carrier member.

The invention is hereafter described with reference to the accompanying drawings, in which:—

Fig. 1 is an elevation showing a correspondence tray as the carrier member provided with one form of the improved bracket made of metal and mounted on a pillar. Fig. 2 is a sectional elevation, on a larger scale, of the bracket shown in Fig. 1. Fig. 3 is a plan of the underside of the upper part of Fig. 2. Fig. 4 is a plan view of Fig. 2 whilst Fig. 5 is a plan of the underside of the lower part of Fig. 2, and Fig. 6 is a side view of Fig. 2.

Figs. 7–11 relate to metal cores or inserts to be moulded into a bracket of synthetic resin or like mouldable material. Fig. 7 is a plan from the underside of a core for the upper arm and Fig. 8 is a section of Fig. 7 on line 8—8. Fig. 9 is a plan of a core for the lower arm, Fig. 10 being a section on line 10—10 of Fig. 9 and Fig. 11 is a side view of Fig. 9.

Fig. 12 is a plan from the underside (similar to Fig. 3) showing the curved bearing surfaces formed integrally with ribs in moulded material.

Figs. 13 to 16 relate to a bracket moulded with a tray. Fig. 13 is a side elevation and Fig. 14 is a view, part section, of the underside of the top of part of Fig. 13. Fig. 15 is a plan, a part being broken away, of Fig. 13 and Fig. 16 is a section on line 16—16 of Fig. 13. Figs. 14 and 16 are on an enlarged scale.

Fig. 17 is a sectional elevation of the lower arm of the bracket according to one form of the invention.

In Fig. 1, I have shown a cylindrical pillar or upright $a$ grooved annularly to form short stems $a^1$ and shoulders $a^2$ and erected on a support such as a table $b$ by means of a screw-clamp $c$, such clamp construction being well known. A carrier member such as a correspondence tray $d$ is provided at one end with the improved bracket indicated as a whole in Figs. 1 and 2 by E. Said bracket engages the pillar $a$ by a slotted upper arme $e^1$ and slotted lower arm $e^2$ forming part of said bracket and connected together by web $e$. The tray or other carrier member can be swung around the pillar or upright until it is presented in the desired direction.

In this arrangement, the bracket E is so constructed that the metal which would otherwise be wholly removed from the upper arm $e^1$ to form the slot therein is utilized in whole or in part to form one or more flanges or curved lengths of bearing surface $f\,f$ integral with the upper arm and adapted to make contact with the exterior of the pillar. These surfaces $f\,f$ may be formed by slitting and bending or pressing the metal. The width of the slot $s$, open at one end, in the upper arm $e^1$ is such that it fits easily upon the reduced stem $a^1$ but the flanges forming curved lengths of bearing surface $f\,f$ depend, and make comparatively lengthy contact with the exterior of the pillar $a$ below the shoulder $a^2$. The metal displaced from the arm $e^1$ to form the slot $s$ is clearly shown in Figs. 2 and 3 in the form of dependent flanges or members $f\,f$ and $f^1\,f^1$, the curved lengths $f$ being divergent inwardly of the slot $s$ and the straight lengths $f^1$ being parallel with the sides of the slot $s$. The bearing surfaces $f\,f$ are rendered divergent by reason of the slits $f^2$ in the metal, see Fig. 2. The height of the annular groove forming the stem $a^1$ is such that the depending flanges $f\,f$ can be passed across the groove and the arm and flanges then lowered to engage the shoulder $a^2$.

These bearing surfaces $f\,f$ do not, it will be noted, extend beyond the open end of the slot $s$ or end remote from the tray or carrier member $d$, but are adjacent to the sides of the slot $s$ and both portions $f\,f$ and $f^1\,f^1$ extend inwardly from the open end of the slot so that there is no projection beyond the mouth of the slot $s$.

The upper arm $e^1$ is secured to the lower arm $e^2$ by the intermediate web $e$ which can be held against the head of the tray $d$ by screws, as indicated in Fig. 1.

The metal which would otherwise be entirely removed from the lower arm $e^2$ to form the slot $s^1$ therein, is utilized in part to form one or more curved members acting as a bearing surface $g^1$ designed to make contact with the exterior of the pillar $a$ and in an opposite direction, or from an opposite side, to the dependent surfaces $f\,f$. The bearing surface $g^1$ on the lower arm $e^2$ is shown in the drawings at Fig. 17 and its arrangement will be understood from the description of the bearing surface upon the extension plate $e^3$ which now follows.

In Figs. 1, 2, 4, 5 and 6 there is represented an extension plate $e^3$ which is integral with the web $e$ and the arms $e^1$ $e^2$; this plate $e^3$ is bent or carried back below the tray, with a space between the lower arm $e^2$ and the extension plate. The bend between the arm $e^2$ and the plate $e^3$ is slotted at $s^1$ to allow the bend to straddle the pillar $a$. The metal which would be removed to form the slot $s^1$ in the lower arm $e^2$ and plate $e^3$ is utilized in part e. g. by slitting and pressing or bending operations, to form one or more curved bearing surfaces for the bottom of the bracket and integral with said bracket. This bearing surface is shown as a dependent curved member $g$ shaped to conform with and bear against the exterior of the pillar $a$. The extension plate $e^3$ may be secured by a screw to the base of the tray $d$, the hole for said screw being shown at $e^4$.

By forming the bearing surfaces $f$ $f$ and $g$ integral with the bracket arms $e^1$ $e^2$ or with the upper arm $e^1$ and the extension plate $e^3$, loose pieces are avoided and consequently the device works smoothly and without rattle. The tray $d$ can be swung horizontally and smoothly to any desired position around the pillar $a$. The bearing surfaces $f$ $f$ $g$ act on the pillar $a$ in opposite directions, the upper ones to resist the pull on the pillar and the lower to exert a thrust on the pillar.

Instead of making the bracket E in one piece, it may obviously be made in sections, the upper one carrying the arm $e^1$ and being secured to the tray or other article by, for instance, screws. The lower section then comprises the lower arm $e^2$, or the arm $e^2$ and plate $e^3$, which must be separately attached by screws or otherwise to the article to be supported.

In the modification shown by Figs. 7 to 11 inclusive, the bracket includes wearing pieces in the form of metal cores moulded in the bracket material such as synethetic resin or the like. These cores are provided with the slot $s^2$ and the flanges $f^1$ and also the metal bearing surfaces $f$ $g$ and when moulded in the material, the slot and bearing surfaces are left exposed. The core $h$ for the upper arm is provided with a dovetail anchor $h^1$ and the core $i$ for the lower arm $e^2$ is provided with a dovetail anchor $i^1$, these anchors being firmly embedded in the material of the bracket and the tray or other article is made of the same material. This material for the bracket and carrier member may be synthetic resin, but these anchor-fitted cores or inserts $h$ $i$ can be secured in cast metal in which case the carrier member will also be of cast metal.

As shown in Fig. 12, I may make the curved bearing surfaces $f^3$ $f^3$ of moulded material integral with the upper arm $e^1$ and the tray $d$, and united with strengthening ribs $j$ formed upon the tray. Thus, instead of making the curved bearing surfaces of, for instance, metal, as shown in Fig. 3, they may be of moulded material such as synthetic resin and integral with the tray.

In the similar arrangement shown in Figs. 13 to 16 inclusive, the tray $d$ and the bracket arms are moulded in synthetic resin or the like and are therefore integral. The upper arm $e^5$ of the bracket-forming portion is connected by the ribs $j$ $j$ with the lower arm $e^6$. Part of the material forming the upper arm is, however, displaced by dies or otherwise at $k$ to form a part-circular recess with walls, the roof $l$ of which rests upon part of the annular shoulder $a^2$ of the pillar, after the stem $a^1$ has been passed up the slot $s^3$. This arrangement provides the curved bearing surface $k^1$ formed or left by the counterbore concentrically with the closed end of the slot $s^3$ and portions of this bearing surface $k^1$ diverge from the lower or under portions of the straight sides of slot $s^3$. The slot $s^3$ here corresponds with slot $s$ of Fig. 3.

The lower arm $e^6$ is slotted at $s^4$ (this slot corresponding with slot $s^1$ of Fig. 2) and the closed end of slot $s^4$ (which closed end is preferably semi-circular) bears against the exterior of pillar $a$. The weight of the tray draws these curved surfaces $k^1$ against the pillar.

It will thus be seen that the bracket according to the present invention is so constructed that the material which would otherwise be removed from the upper arm of the bracket to form the slot therein, is utilized in whole or in part to provide one or more curved bearing surfaces integral with the said upper arm and extending inwards from the open end of the slot and adapted to make contact with the exterior of the pillar. The upper slotted arm incorporates lengths of curved bearing surface engaging with the exterior of the pillar, said lengths of bearing surface being integral with the material of the arm and diverging from the straight sides of the slot so as to engage the said pillar.

A bracket for the carrier member is thus obtained which is free from loose pieces, free from projections beyond the open end of the slot and at its upper and lower ends gives lengthy bearing contacts with the pillar.

What I claim is:—

1. In a device of the character described, and having a grooved pillar providing an annular shoulder, a bracket integral with a carrier member and made of moulded material, said bracket comprising an upper arm which is slotted from one end and provided at the closed end of said slot with a part-circular recess forming a roof-portion and curved walls, said roof-portion resting upon the said annular shoulder of said pillar, said bracket comprising also a lower arm slotted from one end and closed at the opposite end, said curved walls of the upper arm being integral with the moulded material of the bracket, and said curved walls and the closed end of the said slot in the lower arm making contact with the exterior of said pillar.

2. In a device of the character described for engaging a pillar having an annular groove to provide a shoulder on said pillar, a combined one-piece bracket and tray both formed of moulded synthetic resin, said bracket portion including an upper slotted arm having at the inner end of the slot and on its underside a part-circular recess adapted to engage said shoulder, said part circular recess resisting the lateral pull of said tray on said shoulder, said bracket including also a lower slotted arm, the end of the slot in said lower arm exerting a thrust upon said pillar, and ribs of moulded synthetic resin between said upper arm and said lower arm, said upper and lower arms and ribs being integral with the tray.

JOHN WILLIAM DONALD COOK.